United States Patent
Ventura

(10) Patent No.: US 7,766,430 B2
(45) Date of Patent: Aug. 3, 2010

(54) SECOND ROW SEAT ASSEMBLY HAVING FOLD FLAT MECHANISM WITH FORWARD CUSHION MOVEMENT

(75) Inventor: Kevin J. Ventura, Aschaffenburg (DE)

(73) Assignee: Intier Automotive Seating Systems GmbH, Sailauf (DE)

(*) Notice: Subject to any disclaimer, the term of this patent is extended or adjusted under 35 U.S.C. 154(b) by 277 days.

(21) Appl. No.: 11/996,294

(22) PCT Filed: Sep. 14, 2006

(86) PCT No.: PCT/EP2006/008956

§ 371 (c)(1),
(2), (4) Date: Jan. 21, 2008

(87) PCT Pub. No.: WO2007/031313

PCT Pub. Date: Mar. 22, 2007

(65) Prior Publication Data

US 2008/0211282 A1    Sep. 4, 2008

(51) Int. Cl.
*B60N 2/02*    (2006.01)

(52) U.S. Cl. ............. 297/378.1; 297/334; 296/65.09

(58) Field of Classification Search .......... 297/378.1, 297/378.12, 334, 335; 296/65.09
See application file for complete search history.

(56) References Cited

U.S. PATENT DOCUMENTS

| | | | |
|---|---|---|---|
| 2,926,949 A | 3/1960 | Himka et al. | |
| 3,311,405 A | 3/1967 | Brennan et al. | |
| 4,805,953 A | 2/1989 | Yamauchi | |
| 5,588,707 A | 12/1996 | Bolsworth | |
| 6,688,696 B2 | 2/2004 | Brush et al. | |
| 7,014,263 B2* | 3/2006 | Mukoujima et al. | 297/378.1 |
| 7,497,517 B2* | 3/2009 | Gundall et al. | 297/378.12 |
| 2001/0001526 A1 | 5/2001 | Moon | |
| 2005/0110324 A1 | 5/2005 | Mori et al. | |
| 2005/0225143 A1 | 10/2005 | Sun et al. | |
| 2005/0248199 A1 | 11/2005 | Epaud | |

FOREIGN PATENT DOCUMENTS

DE    10055205 A1    6/2002

* cited by examiner

*Primary Examiner*—Anthony D Barfield
(74) *Attorney, Agent, or Firm*—Clarkhill PLC

(57) ABSTRACT

A seat assembly is adapted to be coupled to a vehicle floor and includes a seat back (16) and a seat cushion (12). The seat back is pivotally coupled to a support bracket (50) mounted to the floor. A fold flat mechanism (58) includes a transfer link (60) pivotally coupled to the support bracket, a seat cushion link (68) coupled between the seat cushion and the transfer link, and a seat back link (76) coupled between the seat back and the transfer link for transferring pivotal movement of the seat back through the transfer link to the seat cushion link to automatically move the seat assembly between a seating position wherein the seat back is in an upright position and the seat cushion is spaced above the floor, and a stowed position wherein the seat back is pivoted to a fold flat position overlying the seat cushion and the seat cushion is lying flat against the floor.

2 Claims, 7 Drawing Sheets

US 7,766,430 B2

SECOND ROW SEAT ASSEMBLY HAVING FOLD FLAT MECHANISM WITH FORWARD CUSHION MOVEMENT

BACKGROUND OF THE INVENTION

1. Field of the Invention

The invention relates to a seat assembly for an automotive vehicle. More particularly, the invention relates to a seat assembly having a fold flat mechanism for pivoting the seat back flat against the seat cushion while simultaneously moving the seat cushion forward and flat against the floor of the vehicle.

2. Description of the Related Art

Automotive vehicles include seat assemblies for supporting occupants within the vehicle. Seat assemblies are typically arranged within at least a front, or first row, and a rear, or second row, of the vehicle. Each seat assembly typically includes a generally horizontal seat cushion coupled to a generally vertical seat back. It is known in the seating art to provide a stowable seat assembly movable between a seating position for supporting a seat occupant above a floor of the vehicle and a stowed position lying flat against the floor, or nested within a recess formed in the floor. Typically, in such seat assemblies, the seat back is pivotally coupled to the seat cushion for movement between a generally upright position and a forward fold flat position overlying the seat cushion.

Additionally, the seat cushion often includes a four bar linkage mechanism extending between the seat cushion and the floor of the vehicle for moving the seat assembly between a seating position spaced above the floor and a stowed position resting against the floor. The pivotal movement of the seat back is actuated and controlled independently of the movement of the seat cushion, thus requiring separate operation to move the seat assembly from the seating position to the stowed position. Therefore, it remains desirable to provide a mechanism coupled between the seat back and the seat cushion for moving the seat assembly between the seating position and the stowed position in response to pivotal movement of the seat back between the generally upright position and the forward fold flat position.

SUMMARY OF THE INVENTION

According to one aspect of the invention, a seat assembly is adapted to be coupled to the floor of an automotive vehicle. The seat assembly includes a seat cushion having a forward end and a rearward end and a seat back having an upper end and a lower end. A support bracket is adapted to be coupled between the seat back and the floor of the vehicle. A recliner mechanism is pivotally coupled between the support bracket and the lower end of the seat back for supporting the seat back through pivotal movement between an upright position and a fold flat position overlying the seat cushion. A pair of cushion support links is pivotally coupled between the forward end of the seat cushion and the floor for supporting and guiding the seat cushion. A fold flat mechanism is operatively coupled between the rearward end of the seat cushion and the lower end of the seat back. The fold flat mechanism includes a transfer link pivotally coupled to the support bracket, a seat cushion link coupled between the seat cushion and the transfer link, and a seat back link coupled between the seat back and the transfer link for transferring pivotal movement of the seat back through the transfer link to the seat cushion link to automatically move the seat assembly between a seating position wherein the seat back is in the upright position and the seat cushion is spaced above the floor, and a stowed position wherein the seat back is pivoted to the fold flat position overlying the seat cushion and the seat cushion is lying flat against the floor.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE PREFERRED EMBODIMENT

Figure 1:
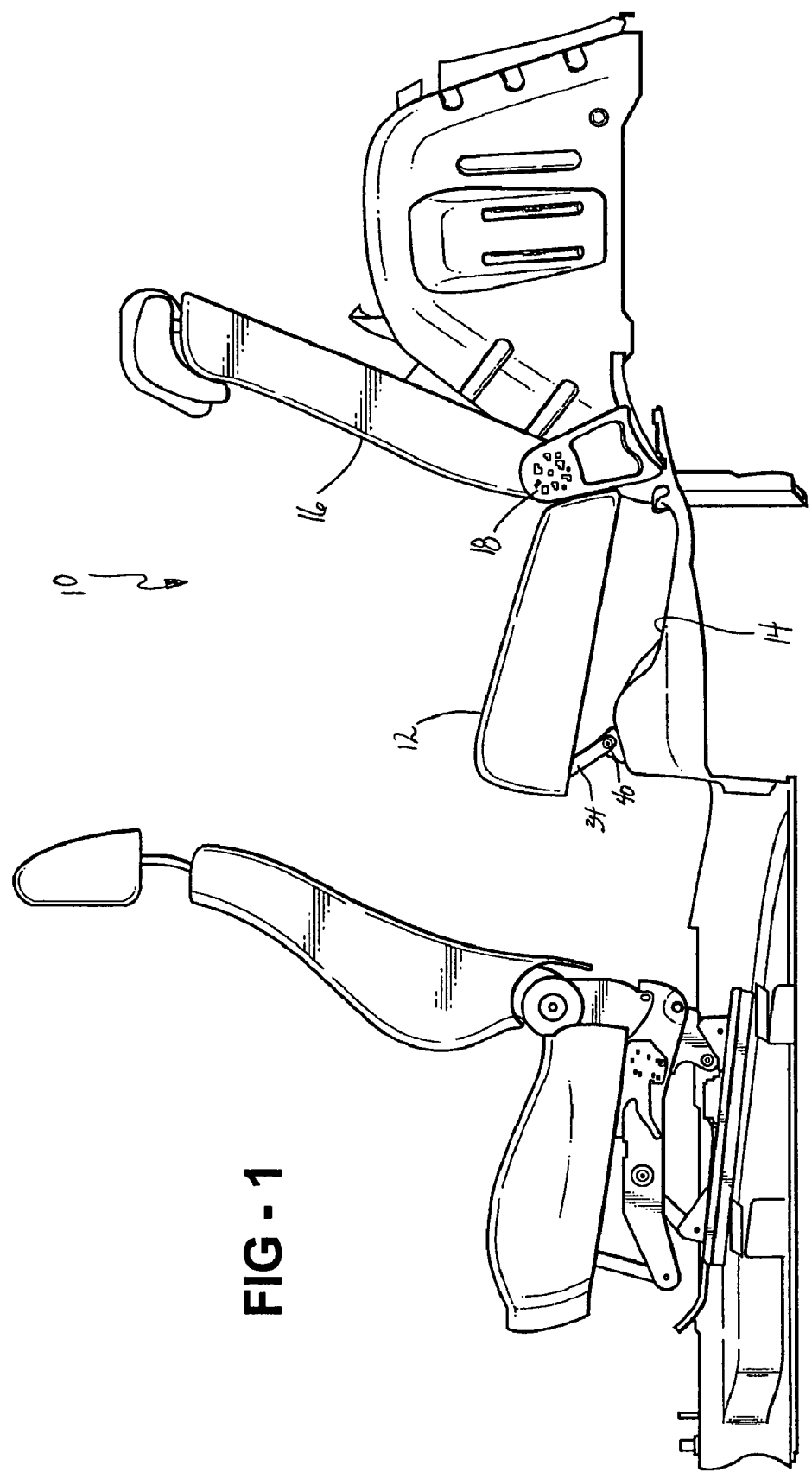
FIG. 1 is a side view of a seat assembly in a seating position spaced above a vehicle floor.
Figure 2:
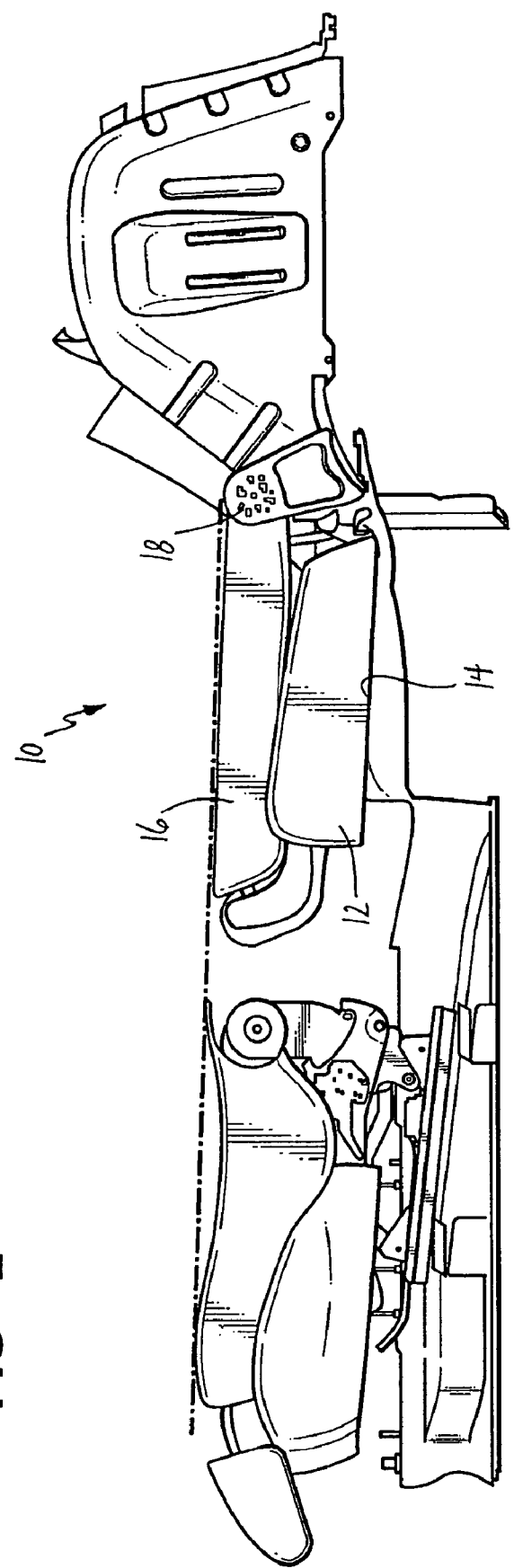
FIG. 2 is a side view of the seat assembly in a stowed position lying flat against the vehicle floor.

Referring to FIGS. 1 and 2, a seat assembly for an automotive vehicle is generally shown at 10. In the embodiment shown, the seat assembly 10 is for a second row, or passenger row, of the vehicle. It will, however, be appreciated that the seat assembly 10 may be utilized in any seating position within the vehicle without varying from the scope of the invention. The seat assembly 10 includes a seat cushion 12 for supporting a seat occupant above a floor 14 of the vehicle. The seat assembly 10 also includes a seat back 16 operatively coupled to the seat cushion 12 and movable between a generally upright position, shown in FIG. 1, and a forward fold flat position, shown in FIG. 2, overlying the seat cushion 12. A recliner mechanism 18, as is commonly known in the art, is provided for pivotal movement of the seat back 16 between the upright position and the fold flat position. The recliner mechanism 18 may also provide fore and aft pivotal reclining adjustment of the seat back 16 relative to the seat cushion 12 for occupant comfort. The seat assembly 10 is moveable between a seating position, as shown in FIG. 1, wherein the seat back 16 is in the upright position and the seat cushion is spaced above the floor 14 of the vehicle, and a stowed position, as shown in FIG. 2, wherein the seat back 16 is pivoted to the fold flat position and the seat cushion 12 is lying flat against the floor 14.

Referring to FIGS. 3 through 6, the seat cushion 12 includes a seat pan 20 having opposing top 22 and bottom 24 contoured surfaces and extending between a forward end 26 and a rearward end 28. The bottom surface 24 of the seat pan 20 is shaped to match a corresponding contour on the floor 14 of the vehicle such that the seat cushion 12 lies flush against the floor 14 when the seat assembly 10 is in the stowed position. A front support rod 30 is fixedly secured to the bottom surface 24 and extends laterally between opposing sides of the seat cushion 12 adjacent the forward end 26 of the seat pan 20. A rear support rod 32 is similarly fixedly secured to the bottom surface 24 and extends laterally between the opposing sides of the seat cushion 12 adjacent the rearward end 28 of the seat pan 20. A pair of cushion support links 34 is pivotally coupled between the front support rod 30 and the floor 14 for pivotally supporting and guiding the seat cushion 12. More specifically, each cushion support link 34 extends between a first end 36 pivotally connected to a distal end 38 of the front support rod 30 and an opposite second end 40 pivotally connected to the floor 14 of the vehicle.

The seat back 16 includes a seat back frame 42 extending between an upper end 44 and lower end 46. A recliner bracket 48 extends from each side of the seat back frame 42 adjacent the lower end 46 thereof. A support bracket 50 is pivotally coupled to each of the recliner brackets 48 and each support bracket 50 is fixedly secured to the floor 14 for pivotally supporting the seat back 16. More specifically, each support bracket 50 is generally U-shaped and includes an outer portion 52 and an inner portion 54 offset inwardly and parallel to the outer portion 52. Each recliner mechanism 18 includes a recliner shaft 56 pivotally connecting the recliner bracket 48 and the outer portion 52 of the support bracket 50 to provide pivotal movement of the seat back 16 between the upright and fold flat positions.

Figure 4:
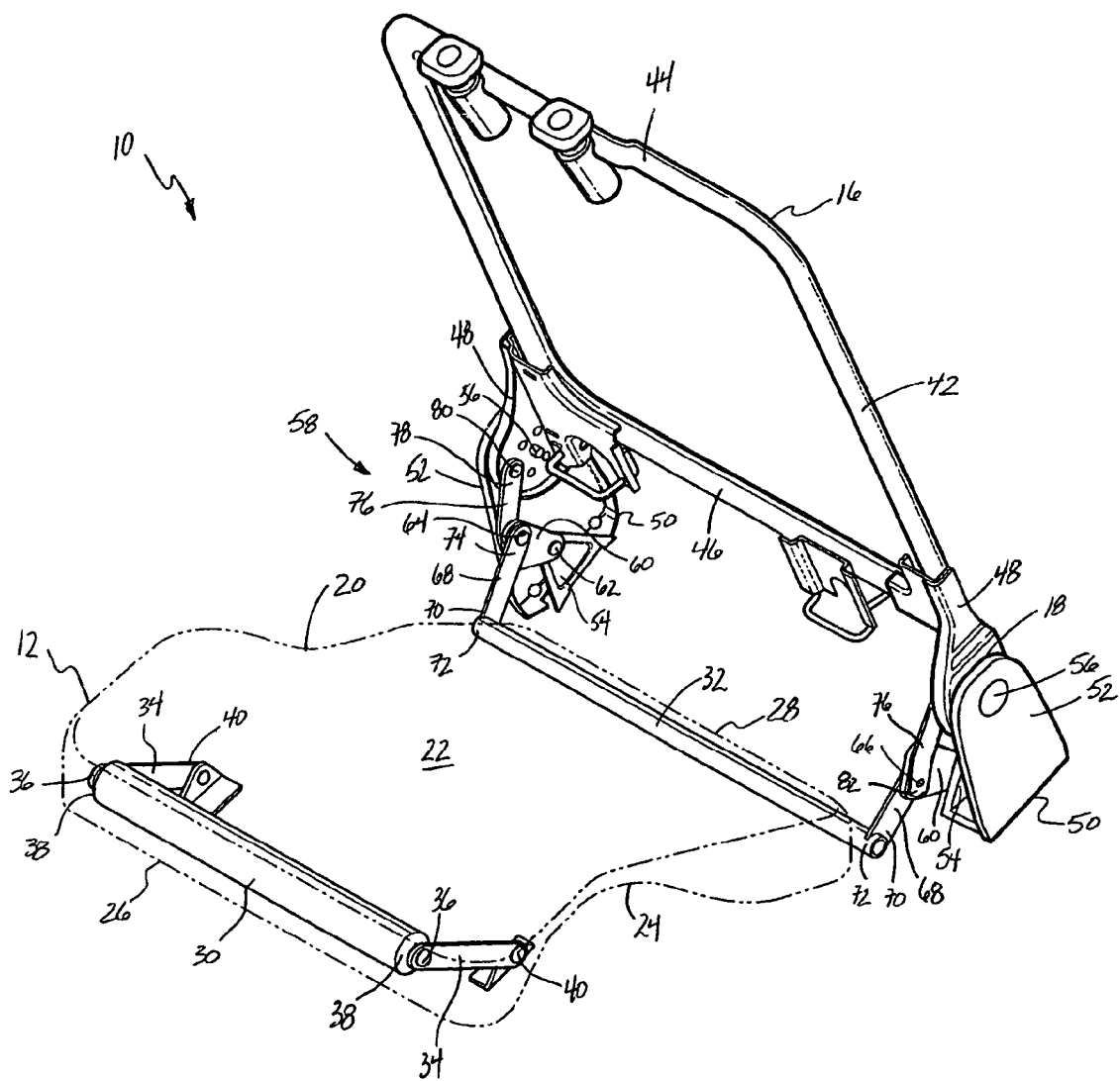
FIG. 4 is a front perspective view of the seat assembly moved partially between the seating position and the stowed position illustrating the fold flat mechanism.
Figure 5:
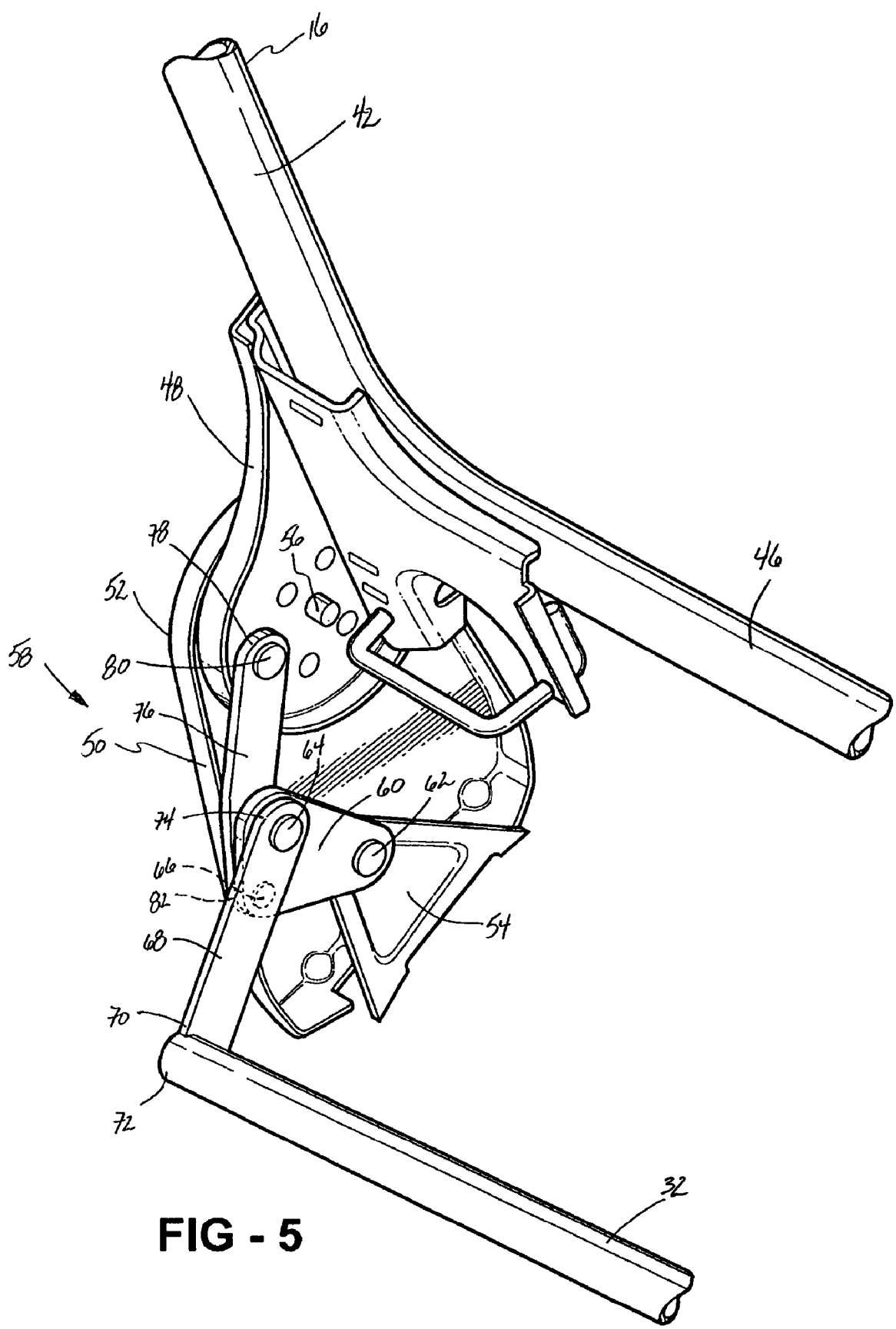
FIG. 5 is an enlarged, front perspective view of the fold flat mechanism of FIG. 4.
Figure 6:
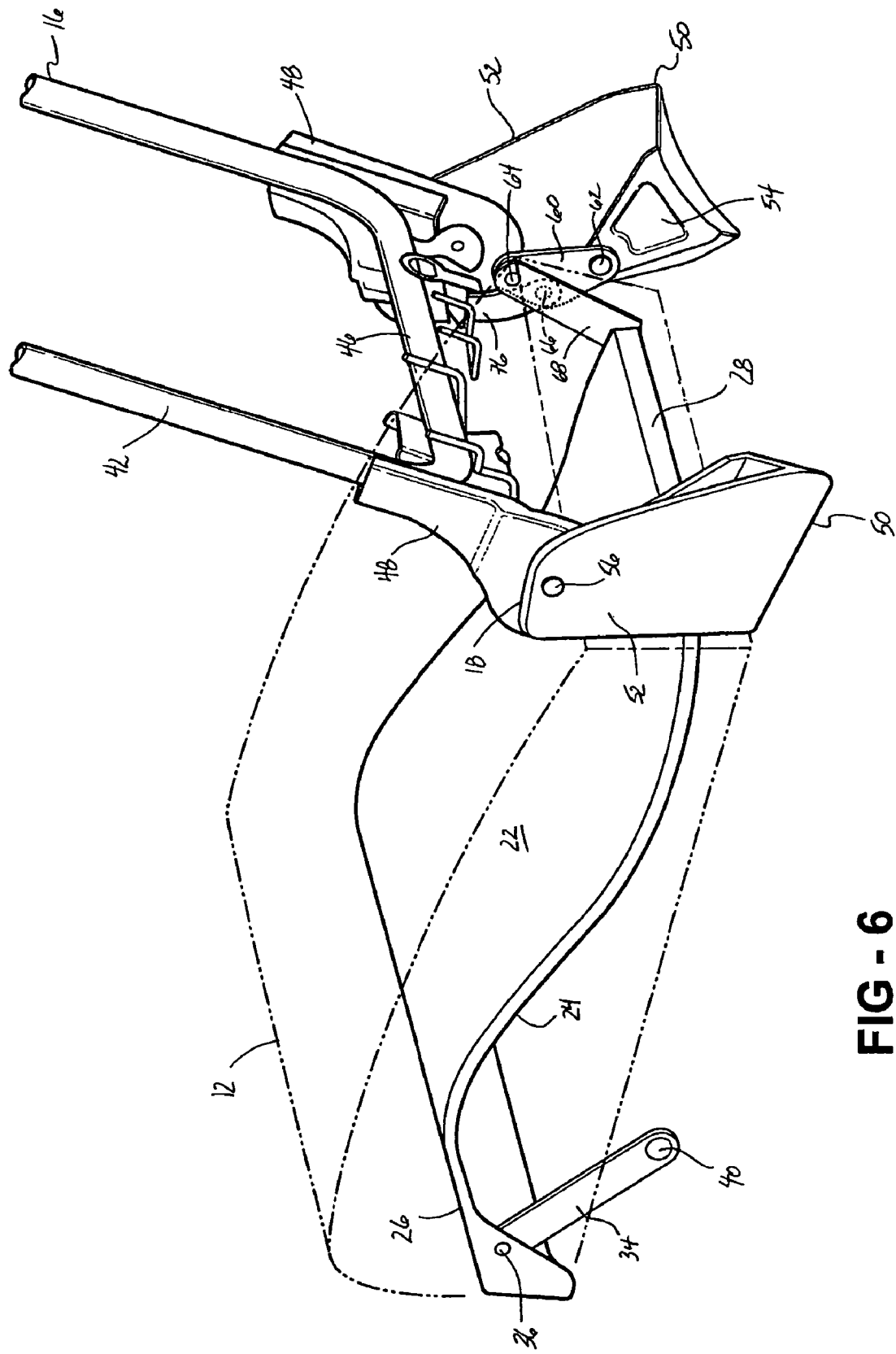
FIG. 6 is a rear perspective view of the seat assembly in the seating position illustrating the fold flat mechanism.

Referring to FIGS. 4 through 6, the seat assembly 10 includes a fold flat mechanism, generally shown at 58. The fold flat mechanism 58 is operatively coupled between the seat cushion 12 and seat back 16 for automatically moving the seat assembly 10 between the seating position and the stowed position in response to pivotal movement of the seat back 16 between the upright position and the fold flat position. The fold flat mechanism 58 includes a triangular-shaped transfer link 60 having a first pivot 62, a second pivot 64, and a third pivot 66 defining each corner of the transfer link 60. The first pivot 62 pivotally connects the transfer link 60 to the inner portion 54 of the support bracket 50. A seat cushion link 68 extends between a first end 70 pivotally connected to a distal end 72 of the rear support rod 32 and an opposite second end 74 pivotally connected to the second pivot 64 of the transfer link 60. A seat back link 76 extends between a first end 78 pivotally connected to the recliner bracket 48 at pivot 80 and an opposite second end 82 pivotally connected to the third pivot 66 of the transfer link 60. In the embodiment shown, when the seat assembly 10 is in the seating position, the pivot 80 between the first end 78 of the seat back link 76 and the recliner bracket 48 is spaced forward of the recliner shaft 56. The third pivot 66 of the transfer link 60 is spaced below the second pivot 64 of the transfer link 60. It will be appreciated that while only one fold flat mechanism 58 is described in detail, both lateral sides of the seat cushion 12 and seat back 16 are operatively coupled by fold flat mechanisms 58.

Figure 3:
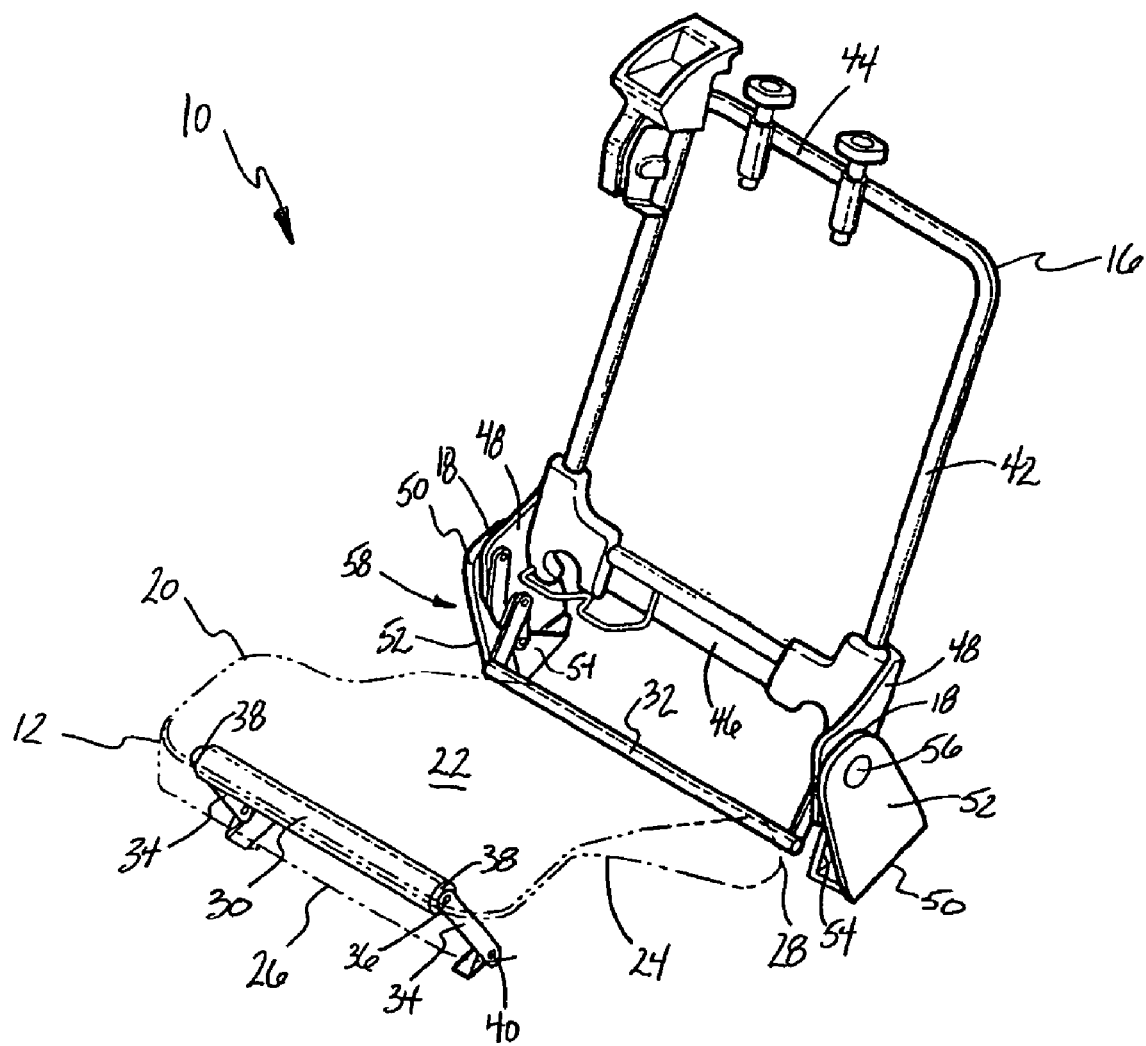
FIG. 3 is a front perspective view of the seat assembly in the seating position including a fold flat mechanism according to one embodiment of the invention.
Figure 7:
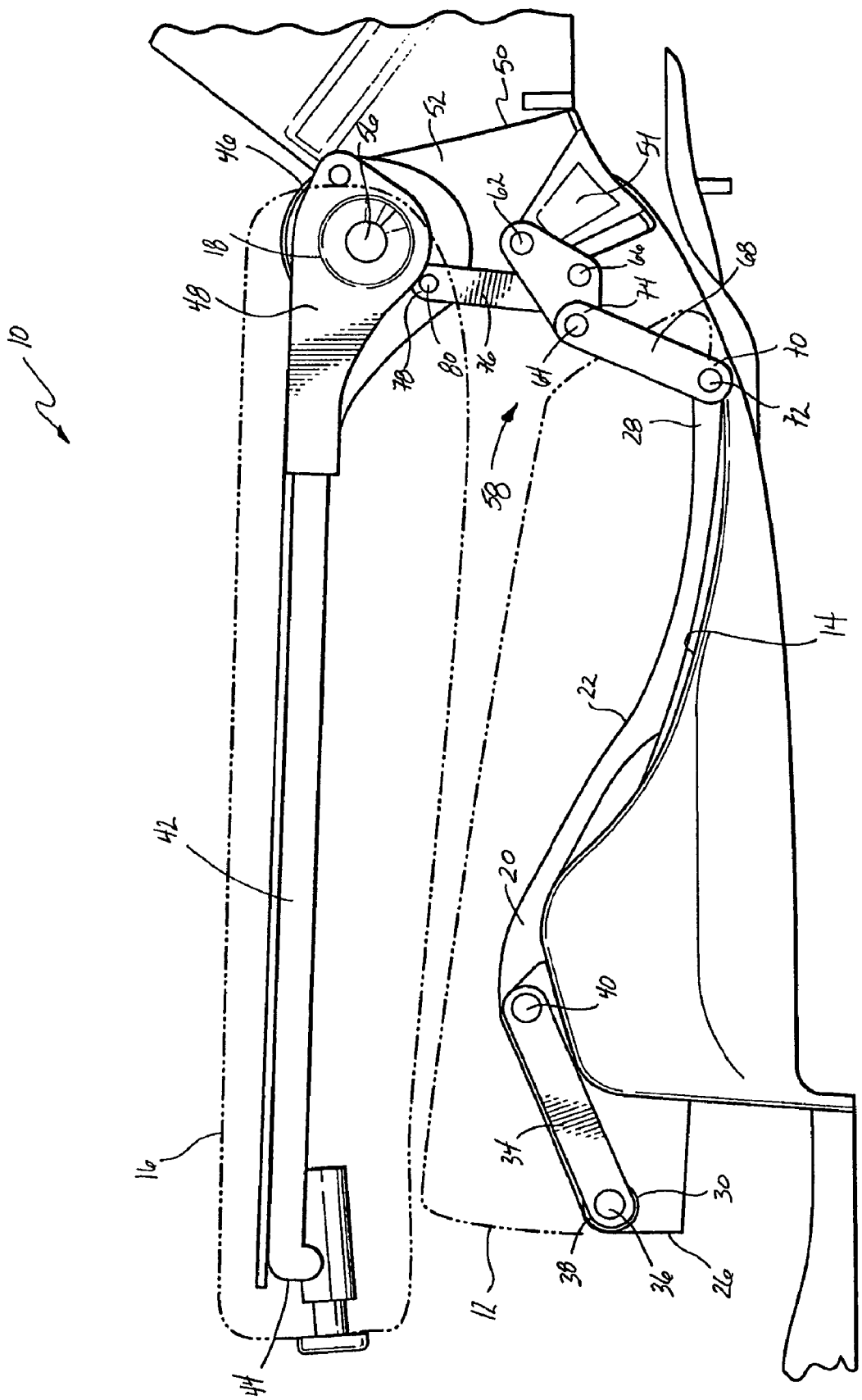
FIG. 7 is a side view of the seat assembly in the stowed position illustrating the fold flat mechanism.

In operation, starting with the seat assembly 10 in the seating position, the seat cushion 12 is supported and spaced above the floor 14 of the vehicle by the cushion support links 34 and the seat cushion links 68 as shown in FIGS. 1 and 3. The seat back 16 is supported in the upright position by the recliner brackets 48 and the seat back links 76. To move the seat assembly 10 from the seating position to the stowed position, the recliner mechanism 18 is released by any means commonly known in the art to unlock and allow the seat back 16 to pivot forwardly about the recliner shaft 56 toward the fold flat position shown in FIGS. 2 and 7. In response to pivotal movement of seat back 16, the fold flat mechanism 58 automatically moves the seat cushion 12 forwardly and downwardly toward the floor 14. More specifically, as the seat back 16 pivots forwardly, the seat back link 76 pushes downwardly on the transfer link 60 through the third pivot 66 forcing the transfer link 60 to pivot about the first pivot 62 pivotally connected to the inner portion 54 of the support bracket 50. The pivotal movement of the transfer link 60 about the first pivot 62 is transferred to the second pivot 64 to push forwardly and downwardly on the seat cushion link 68 moving the seat cushion 12 forward and toward the floor 14 of the vehicle. At the same time, the cushion support links 34 pivot about the second ends 40 to move the seat cushion 12, and thus the seat assembly 10, forwardly and downwardly. The seat back 16 continues to pivot forwardly to the fold flat position overlying the seat cushion 12 until the seat cushion 12 is lying flat against the floor 14 of the vehicle and the seat assembly 10 is in the stowed position, as shown in FIGS. 2 and 7.

To return the seat assembly 10 to the seating position, the seat back 16 is simply pivoted upwardly away from the seat cushion 12 from the fold flat position to the upright position. In response to pivotal movement of seat back 16, the fold flat mechanism 58 automatically moves the seat cushion 12 upwardly and rearwardly away from the floor 14. More specifically, as the seat back 16 pivots upwardly, the seat back link 76 pulls upwardly on the transfer link 60 through the third pivot 66 forcing the transfer link 60 to pivot in the opposite direction about the first pivot 62. The pivotal movement of the transfer link 60 simultaneously pulls the seat cushion link 68 upwardly through the second pivot 64 to raise the seat cushion 12 away from the floor 14 of the vehicle. At the same time, the cushion support links 34 pivot about the second ends 40 to move the seat cushion 12 upwardly and rearwardly away from the floor 14. The seat back 16 continues to pivot upwardly to the upright position until the seat cushion 12 is spaced above the floor 14 of the vehicle and the seat assembly 10 is returned to the seating position, as shown in FIGS. 1 and 6.

The invention has been described here in an illustrative manner, and it is to be understood that the terminology used is intended to be in the nature of words or description rather than limitation. Many modifications and variations of the present invention are possible in light of the above teachings. It is, therefore, to be understood that within the scope of the appended claims, the invention may be practiced other than as specifically enumerated within the description.

The invention claimed is:

1. A seat assembly adapted to be coupled to the floor of an automotive vehicle, said seat assembly comprising:
   a seat cushion having a forward end and a rearward end;
   a seat back having an upper end and a lower end;
   a support bracket adapted to be coupled between said seat back and the floor of the vehicle;
   a pair of cushion support links coupled between said forward end of said seat cushion and the floor for pivotally supporting and guiding said seat cushion; and
   a fold flat mechanism operatively coupled between said rearward end of said seat cushion and said lower end of said seat back, said fold flat mechanism including a transfer link pivotally coupled to said support bracket, a seat cushion link coupled between said seat cushion and said transfer link, and a seat back link coupled between said seat back and said transfer link for transferring pivotal movement of said seat back through said transfer link to said seat cushion link to automatically move said seat assembly between a seating position, wherein said seat back is in said upright position and said seat cushion is spaced above the floor and a stowed position,
   wherein said seat back is pivoted to said fold flat position and said seat cushion is lying flat against the floor,
   characterised in, that
   the assembly comprises further a recliner mechanism pivotally coupled between said support bracket and said lower end of said seat back for supporting said seat back through pivotal movement between an upright position and a fold flat position overlying said seat cushion;

and that the transfer link for transferring pivotal movement is constructed as a one-sided lever by extending the travel in a same direction through said transfer link to said seat cushion link.

2. A seat assembly as set forth in claim 1 wherein said transfer link is generally triangular-shaped having a first pivot, a second pivot, and a third pivot defining each corner of the transfer link.

* * * * *